United States Patent
Tibbatts et al.

[11] Patent Number: 5,141,385
[45] Date of Patent: Aug. 25, 1992

[54] IMPLEMENT ATTACHMENT COUPLER

[75] Inventors: James A. Tibbatts, Kenilworth; Peter R. Medcalf, Marshfield, both of United Kingdom

[73] Assignee: Steelfab Limited, United Kingdom

[21] Appl. No.: 542,546

[22] Filed: Jun. 25, 1990

[30] Foreign Application Priority Data

Jun. 29, 1989 [GB] United Kingdom ................ 8914927

[51] Int. Cl.$^5$ ............................................. E02F 3/28
[52] U.S. Cl. ................................ 414/723; 172/275; 403/330; 403/353; 403/317
[58] Field of Search ............ 414/723; 403/330, 353, 403/254, 255, 316, 317; 172/272–275; 37/118 R

[56] References Cited

U.S. PATENT DOCUMENTS

| | | |
|---|---|---|
| 3,606,052 | 9/1971 | Schurz . |
| 4,148,106 | 4/1979 | Gallien ........................ 403/316 X |
| 4,355,945 | 10/1982 | Pilch ............................. 414/723 X |
| 4,413,366 | 11/1983 | Whitehead .................. 403/254 X |
| 4,436,477 | 3/1984 | Lenertz et al. ..................... 414/723 |
| 4,661,036 | 4/1987 | Horsch ........................ 414/723 X |

FOREIGN PATENT DOCUMENTS

| | | |
|---|---|---|
| 0122547 | 10/1984 | European Pat. Off. . |
| 0178556 | 4/1986 | European Pat. Off. . |
| 0321902 | 6/1989 | European Pat. Off. . |
| 8202731 | 8/1982 | PCT Int'l Appl. . |
| 2040262A | 8/1980 | United Kingdom . |
| 1582398 | 1/1981 | United Kingdom . |
| 2087349A | 5/1982 | United Kingdom . |
| 2169582A | 7/1986 | United Kingdom . |
| 2191169A | 12/1987 | United Kingdom . |
| 2205299 | 12/1988 | United Kingdom . |

Primary Examiner—Robert J. Spar
Assistant Examiner—Donald W. Underwood
Attorney, Agent, or Firm—MacMillan, Sobanski & Todd

[57] ABSTRACT

A quick-attach coupler for attaching an implement such as a bucket (15) to a machine such as a front end loader or backhoe. The coupler includes attachment structure (25, 29) for attaching the coupler to the machine, upper receiving structure (20) for receiving an upper coupling structure (18) on the implement and lower receiving structure (19) for receiving a lower coupling structure (17) on the implement. The lower receiving structure has an opening including a locating formation in the form of a threshold (19a) which retains the lower coupling structure (17) in the lower receiving structure, and latch structure (34) associated with the upper receiving structure (20) retain the upper coupling structure (18) within the upper receiving structure (20) and prevent the lower coupling structure (17) disengaging the locating formation (19a) of the lower receiving structure thus maintaining the attachment of the implement on the coupler. The latch structure may be manually operated or remotely operated by pneumatic, hydraulic or electrically operated actuators (69, 75).

11 Claims, 9 Drawing Sheets

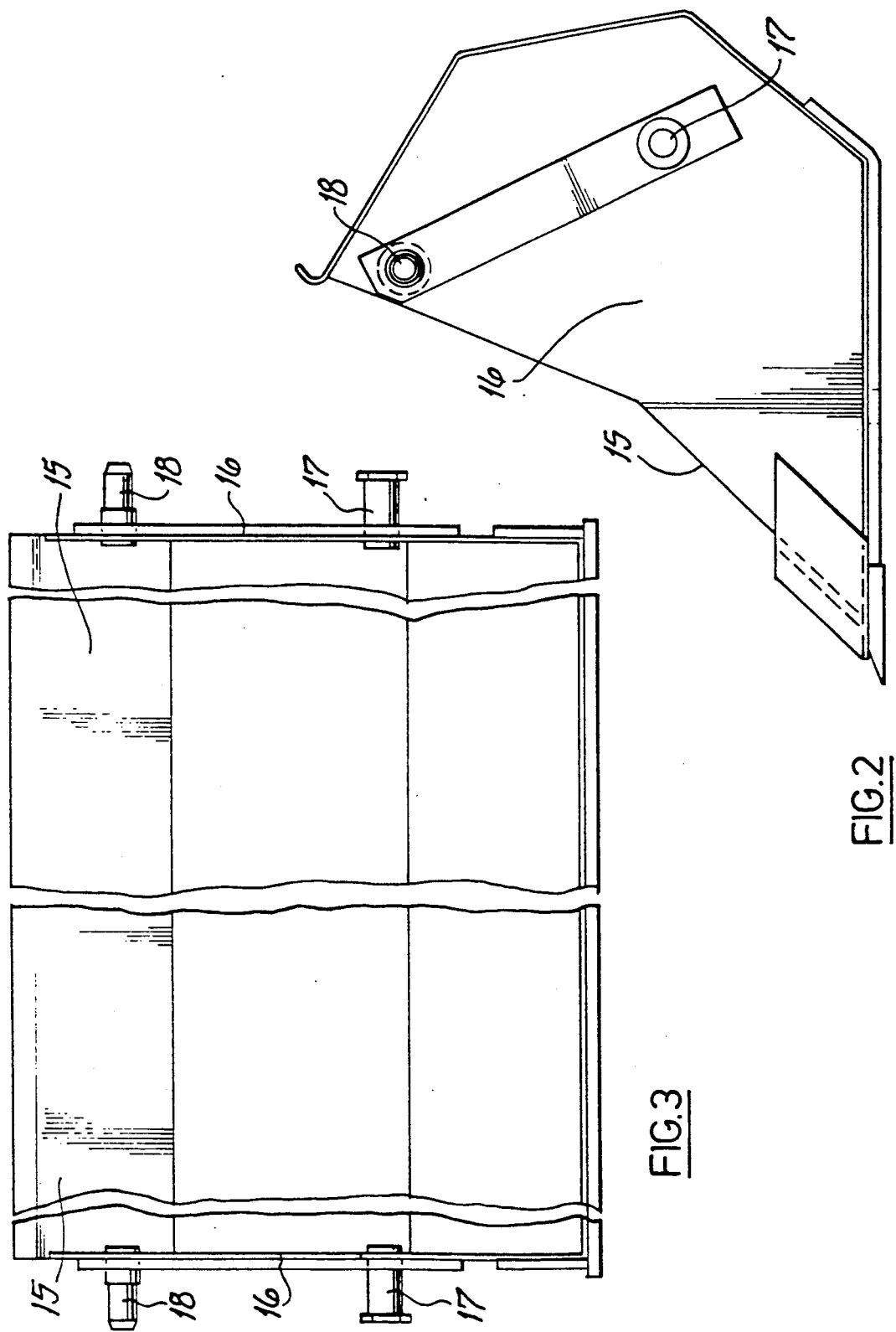

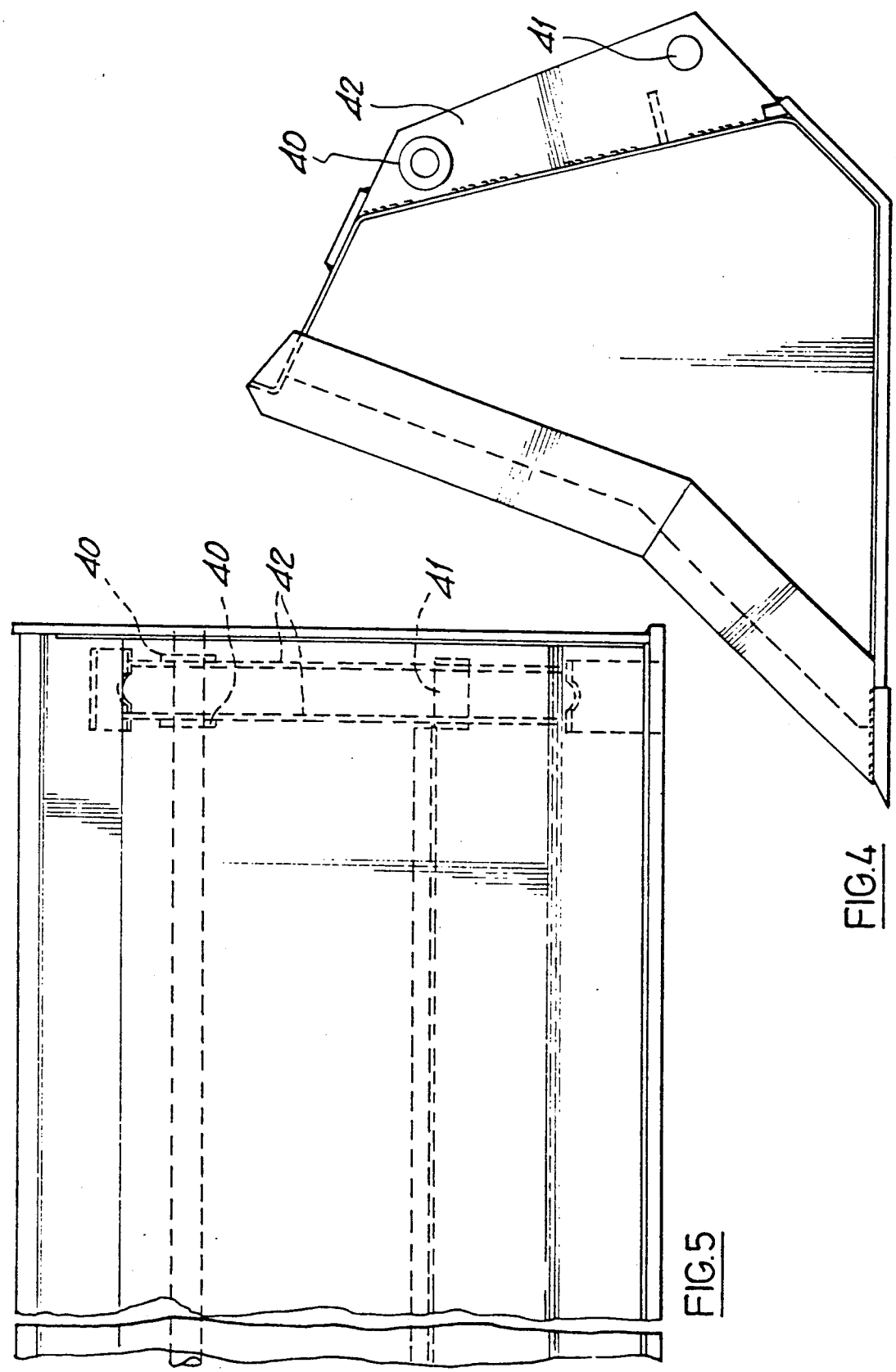

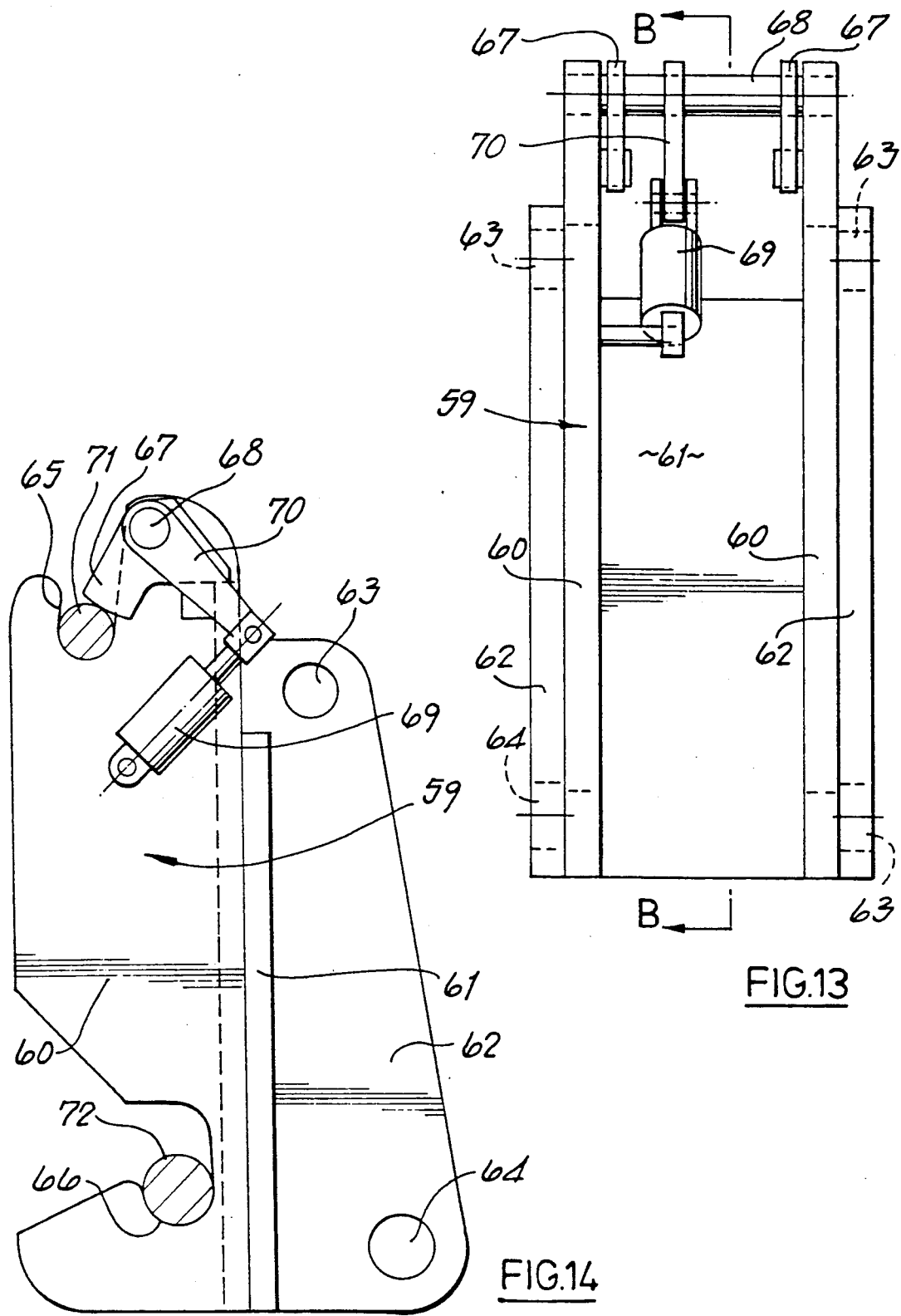

IMPLEMENT ATTACHMENT COUPLER

This invention relates to couplers for attaching implements, such as loading or digging buckets or fork tines, to the end of a support member or members of, for example, a handling, loading or digging machine.

It is an object of the present invention to provide an improved form of quick-attach coupler for coupling implements to, for example, a handling, loading or digging machine.

Thus according to the present invention there is provided a quick-attach coupler for coupling an implement to a machine, the coupler including attachment means for attaching the coupler to the machine, upper receiving means for receiving an upper coupling means on the implement, lower receiving means for receiving a lower coupling means on the implement, said lower receiving means having an opening including a locating formation which retains the lower coupling means in the lower receiving means, and latch means associated with the upper receiving means for retaining the upper coupling means within the upper receiving means and hence preventing the lower coupling means disengaging the locating formation of the lower receiving means.

One advantage of a quick-attach coupler in accordance with the present invention when applied, for example, to a twin arm front end loader is that the coupler can be designed to pick up both the narrower type of implement which is normally slung between the loader arms via coupling means projecting from the sides of the implement and also wider implements designed to be mounted on the loader arms via coupling means on the back of the implement.

In one form of the invention the attachment means comprises first attachment means for pivotally attaching the coupler to a support member or members of the machine and a second attachment means for connecting the coupler to an implement pivotting mechanism of the machine.

In a preferred construction the upper receiving means comprises a pair of upwardly opening slots and the lower receiving means comprises a pair of horizontal opening slots, both pairs of slots being spaced transversely of the coupler.

Preferably the horizontally opening slots which constitute the lower receiving means are each provided with a tapering lead-in to assist in guiding the lower coupling means on the implement into the slot.

The locating formation of the lower receiving means may comprise a threshold over which the lower coupling means passes on its way into the receiving means.

Conveniently, the latch means may comprise a pivotally mounted latch which can be held in a first position allowing free access to the upper receiving means during coupling or de-coupling of an implement and in a second position in which the upper coupling means is held captive in the upper receiving means to prevent disengagement of the lower coupling means from the locating means of the lower receiving means.

The latch may be held in its two positions by a pin manually inserted through aligned holes in the latch and the remainder of the coupler. Alternatively a spring-loaded detent acting between the latch and the remainder of the coupler may be used. In a still further arrangement the latch can be pivotted between its two positions by an actuating means (such as an hydraulic or pneumatic cylinder or solenoid) which can be operated by the machine operator from his driving seat.

One embodiment of the present invention will now be described, by way of example only, with reference to the accompanying drawings, in which:

FIGS. 2 and 3 show side and front views of a narrow type of loader bucket;

FIGS. 4 and 5 show side and front view of a wider type of loader bucket;

FIG. 13 shows an end view of a quick-attach coupler for coupling a backhoe bucket to a dipperstick;

FIG. 14 is a sectional view of the plane B-B of FIG. 13, and

Figure 1:
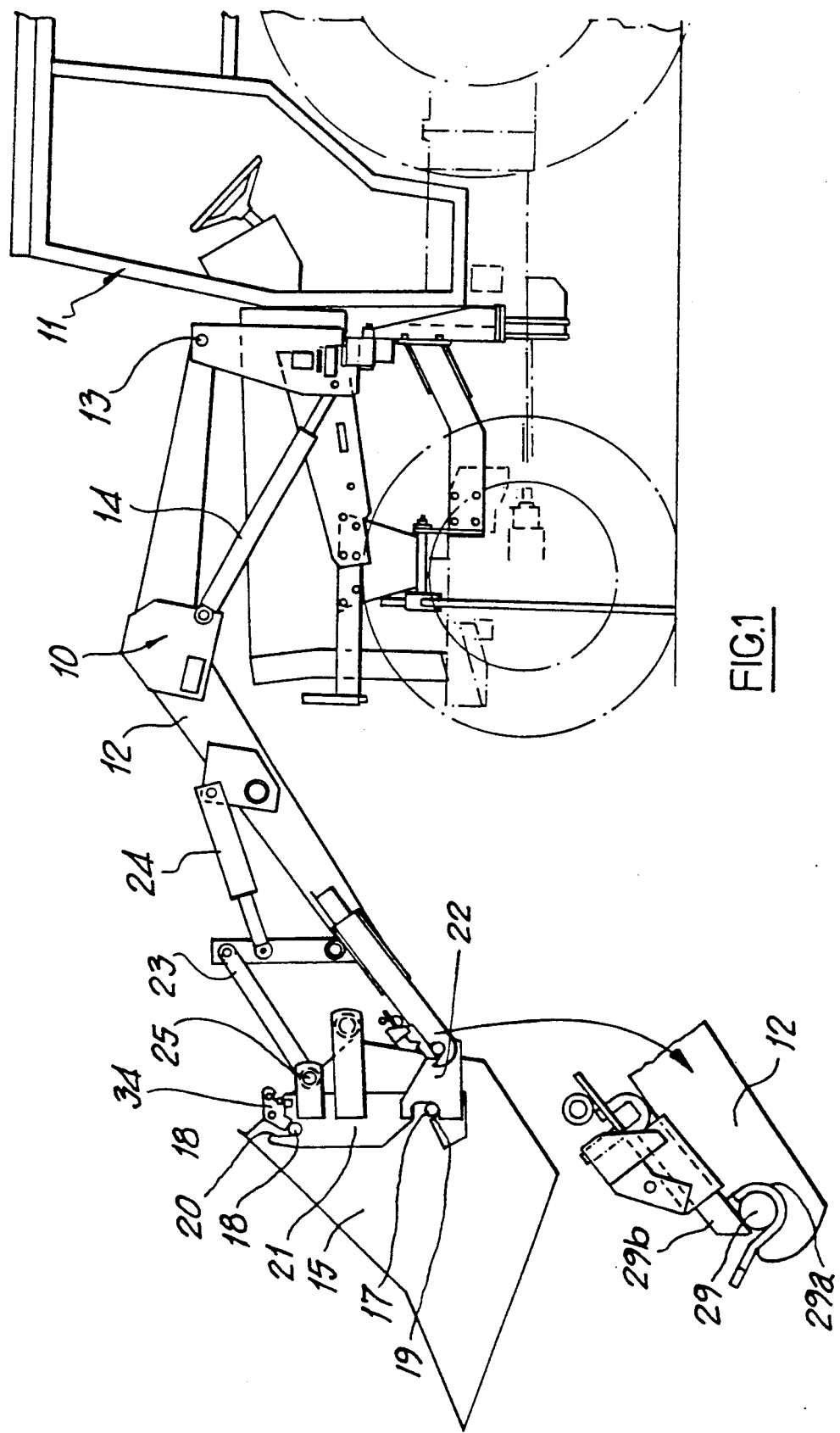
FIG. 1 is a side view of a tractor front end loader fitted with a quick-attach coupler in accordance with the present invention.

Referring to FIG. 1, this shows a front end loader 10 mounted on a tractor 11. The front end loader has a spaced pair of support arms which are pivotally mounted at 13 for raising and lowering in a conventional manner by a pair of lift rams 14, one lift ram acting on each loader arm. Mounted on the ends of the loader arms 12, is a narrower type of bucket 15 of the form shown in FIGS. 2 and 3. The sides 16 of the bucket are provided with lower coupling means in the form of projecting pins 17, and upper coupling means in the form of projecting pins 18. The pins 17 and 18 are received by lower and upper receiving means 19 and 20, provided in a quick coupler 21 in accordance with the present invention.

The quick coupler 21, as will be described in detail below, is itself mounted on each loader arm 12 via a lower pivotal connection 22. Each loader arm also carries a bucket tipping and crowding linkage 23, which includes an hydraulic cylinder 24. Each tipping and crowding linkage being connected to the quick coupler 21 via an upper pivotal connection 25.

Figure 6:
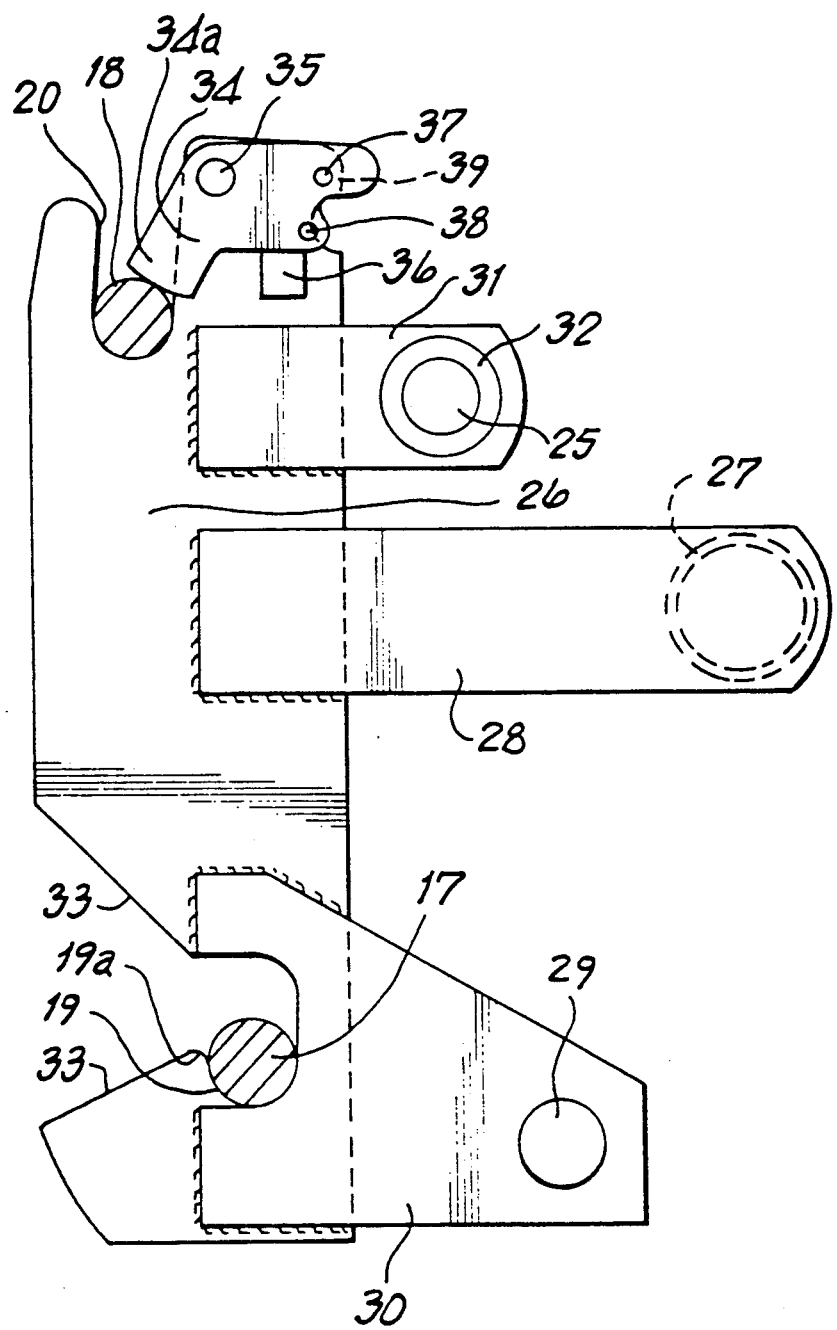
FIGS. 6 and 7 show detail side and rear views of the quick-attach coupler shown in FIG. 1.
Figure 7:
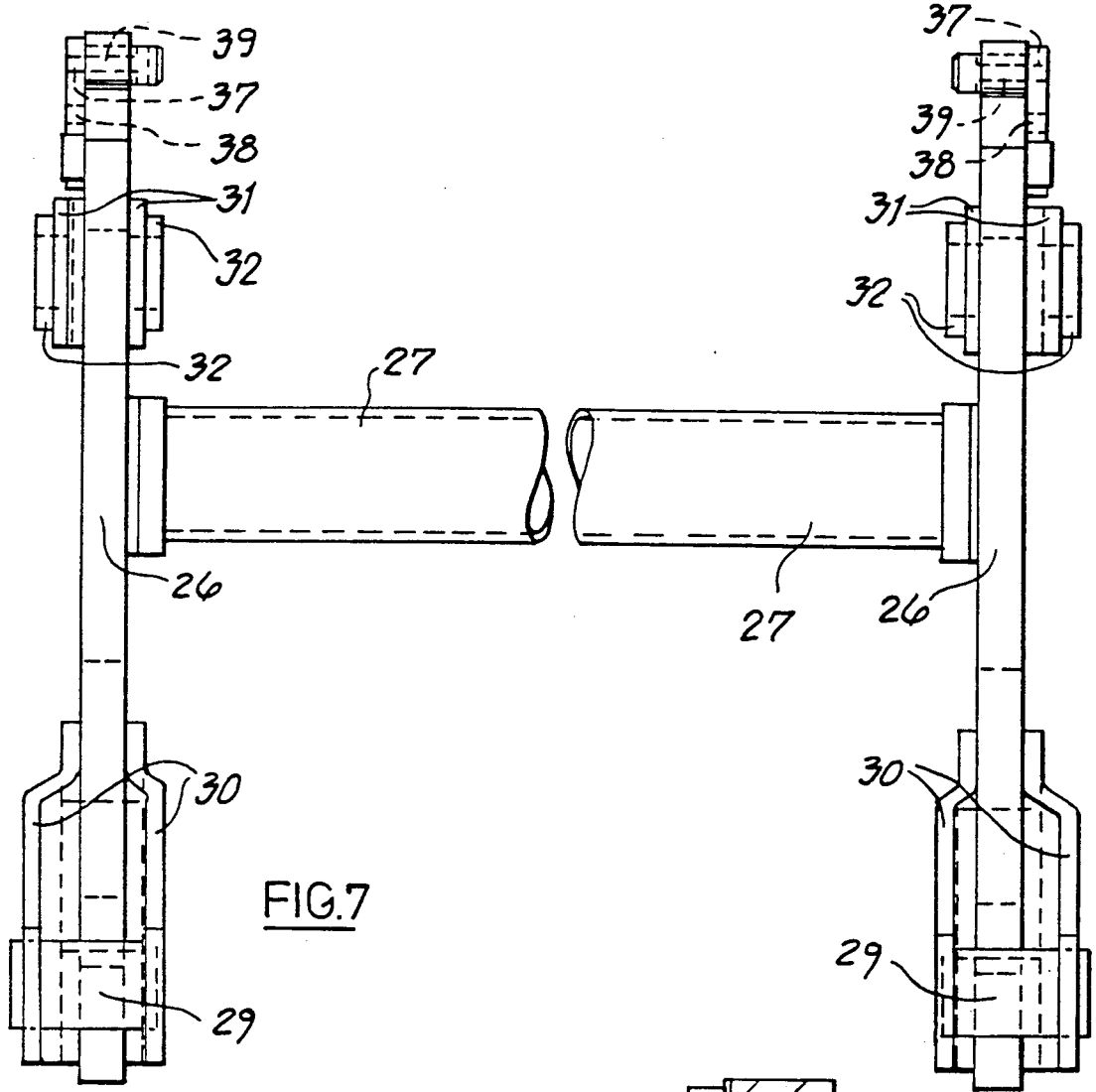
Figure 8:
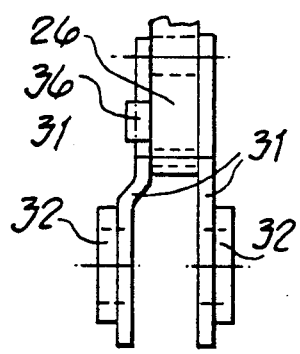
FIG. 8 is a plane view in the direction of Arrow A of FIG. 7.

Referring to FIGS. 6 and 7, the quick coupler 21 comprises a pair of heavy duty side plates 26 which are interconnected by a tubular member 27, which is welded between arms 28. The lower pivotal connection 22 with each loader arm is provided by a pin 29 which is welded between a pair of support plates 30 which are in turn welded onto either side of each heavy duty plate 26. Each pin 29 is held in a retaining recess 29a in the end of its respective loader arm by a spring-loaded latch 29b (see FIG. 1). The upper pivotal connection of the coupler 21 with each tipping and crowding linkage 23 is provided by a pair of plates 31 (see FIG. 8) which are welded onto each side of each heavy duty plate 26 and are provided with reinforcing pivot bosses 32 which receive a pivot pin 25.

Each heavy duty plate 26 includes a lower receiving means in the form of a horizontally opening slot 19 with a tapering lead-in 33. Each slot 19 has a locating formation in the form of a threshold 19a which retains the associated pin 17 in the slot when the bucket 15 is fully mounted on the quick-attach coupler.

At the upper end of each heavy duty plate 26 an upper receiving means in the form an upwardly opening slot 20 is provided which receives the associated upper pin 18 on the bucket. Each slot 20 has a pivoting latch 34 associated therewith. Each latch is mounted on a pivot pin 35 and has its centre of gravity located such as to bias the latch against an associated stop 36. With the latch in the position shown in FIG. 6, the upper pins 18 are held captive in the upwardly opening slot 20, thus preventing disengagement of the lower pins 17 from their associated slots 19. Each latch is provided with 2 holes 37 and 38, each of which can co-operate with the corresponding hole 39 in the associated side plate 26, so that the latch 34 can be held in the position shown in FIG. 6 by inserting a pin through the aligned holes 37 and 39 or can be held in a position in which the end 34a of the latch is clear of the slot 20, by inserting a pin through aligned holes 38 and 39.

Figure 9:
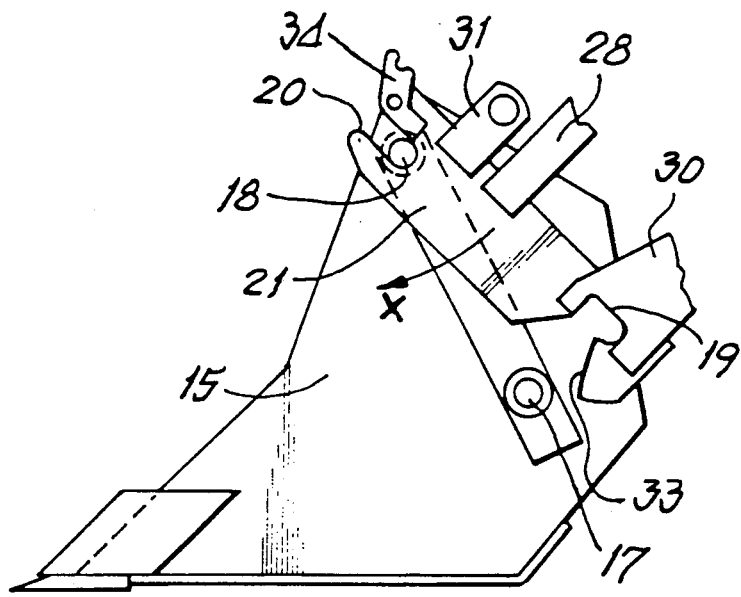
FIGS. 9 and 10 show two stages in the coupling of a bucket to loader arms using the quick coupler shown in FIGS. 1, 6, 7 and 8.
Figure 10:
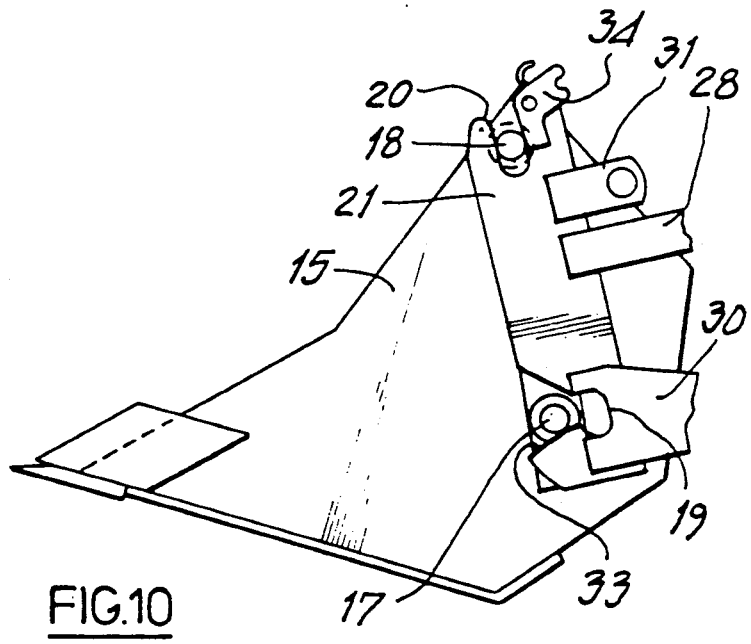

FIGS. 9 and 10 show the sequence of events involved in picking up a bucket using the quick-attach coupler. Thus referring to FIG. 9, the operator positions the coupler at the appropriate height to engage the upper pins 18 with the slot 20, using lift rams 14 and the tipping/crowding cylinders 24. Once the upper pins 18 are engaged in the slot 20 the lift arms 12 are raised to lift the bucket on the upper pins 18 and the coupler 21 is pivotting in the direction of Arrow X of FIG. 8 using the cylinders 24 to engage the lower pin 17 on the tapering lead-in 33 of the lower receiving slots 19. As the lower pins 17 rise up for the tapered lead-in 33 (see FIG. 10) the upper pins 18 also rise in the upper slots 20 until eventually the pins 17 ride over the thresholds 19a and drop into the bottom of slots 19.

The above sequence of events is carried out with the latches 34 stowed in a position clear of the slots 12 by inserting a pin through holes 38 and 39. Once the lower pins 17 have dropped into the bottoms of slots 19, the pins are withdrawn from holes 38 and 39 to allow latches 34 to pivot under their own weight to the position in FIG. 6. The latches are then secured in this position by passing pins through holes 37 and 39.

In addition to the narrower type of bucket shown in FIGS. 2 and 3, the quick attach coupler is also suitable for attaching a wider type of bucket shown in FIGS. 4 and 5, in which upper and lower coupling means are provided on the rear of the bucket in the form of reinforcing pivot bushes 40 and pins 41 carried on to 2 pairs of spaced plates 42. If the quick attach coupler 21 is to pick up a bucket of the form shown in FIGS. 4 and 5, a pin will be inserted through the bushes 40 to enter the upper slots 20 of the coupler and the lower pins 41 will be received in the lower slots 19 of the coupler.

Figure 11:
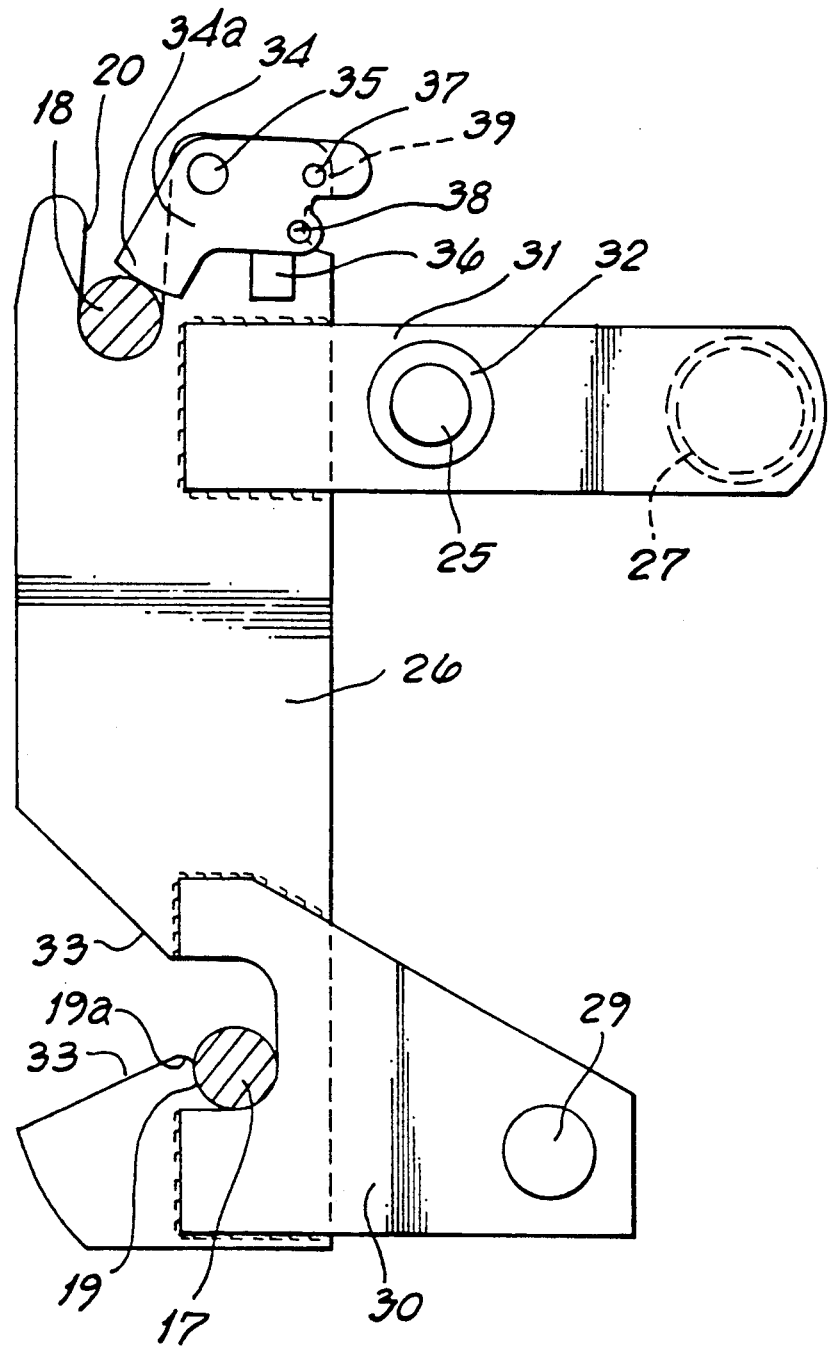
FIG. 11 shows a side view of a modified form of the coupler shown in FIG. 6.

FIG. 11 shows a modified form of quick-coupler in which arms 28 are eliminated and plates 31 are extended to carry the tubular member 27. This produces a more rigid structure with improved freedom of pivotting for the bucket.

Figure 12:
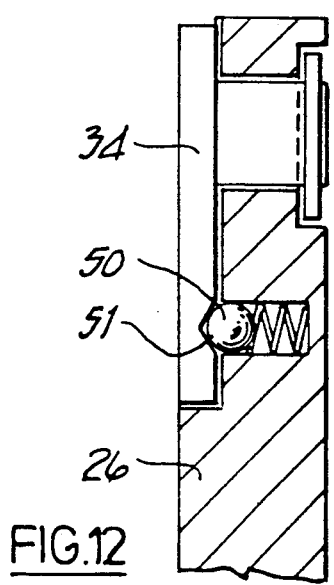
FIG. 12 shows a vertical section through an alternative latch arrangement.

An alternative latch arrangement is shown in FIG. 12 in which the latch 34 is partially recessed into the plate 26 and is held in its two positions by a spring-loaded ball detent 50 which engages one of two recesses 51 which replace the holes 37 and 38.

FIGS. 13 and 14 show a quick-attach coupler 59 in accordance with the present invention for coupling a backhoe digging bucket to the end of a backhoe dipperstick.

The coupler comprises two heavy duty side plates 60 joined by a cross plate 61. Each side plate carries a mounting flange 62 with upper and lower coupling means in the form of holes 63 and 64 respectively. Upper holes 63 are for connection with the end of the dipperstick by a suitable pin and lowerholes 64 are for connection with the bucket tipping/crowding linkage by a suitable pin or pins.

Side plates 60 each include upper and lower slots 65 and 66 of a similar from to slots 20 and 19 described above in relation to coupler 21 and each upper slot is provided with a pivotting latch 67 mounted on a shaft 68 which extends between the plates 60. The latches 67 are mounted on the inside of plates 60 and are movable, between the position shown in FIG. 14 when they project into slots 65 to a position when they are clear of the slots, by a fluid pressure operated cylinder 69 via an arm 70 on shaft 68. This cylinder is supplied with hydraulic fluid via an hydraulic system not shown which is controlled by a lever or other control provided adjacent the drivers seat so that the latches can be moved between the above two positions without the machine operator leaving the driving seat.

The upper and lower slots 65 and 66 receive upper and lower coupling pins 71 and 72 which extend between two flanges provided on the rear of the digging bucket. The bucket is coupled to the coupler 59 in the same manner described above in relation to coupler 21.

It will be appreciated that a pneumatically operated cylinder could be used in place of the cylinder 69. Alternatively the latches 67 could be moved between their two positions by an electrically operated actuator such as a solenoid or linear actuator or other remotely controlled device. Also the principal of the remote operation of latches 67 could be used on the latches 34 of the loader coupler 21 described above. Further, the various actuators described above may be double-acting or single acting with the latch biased towards one of the latch positions and the actuator arranged to move the latch to the other latch position against the action of the bias.

Figure 15:
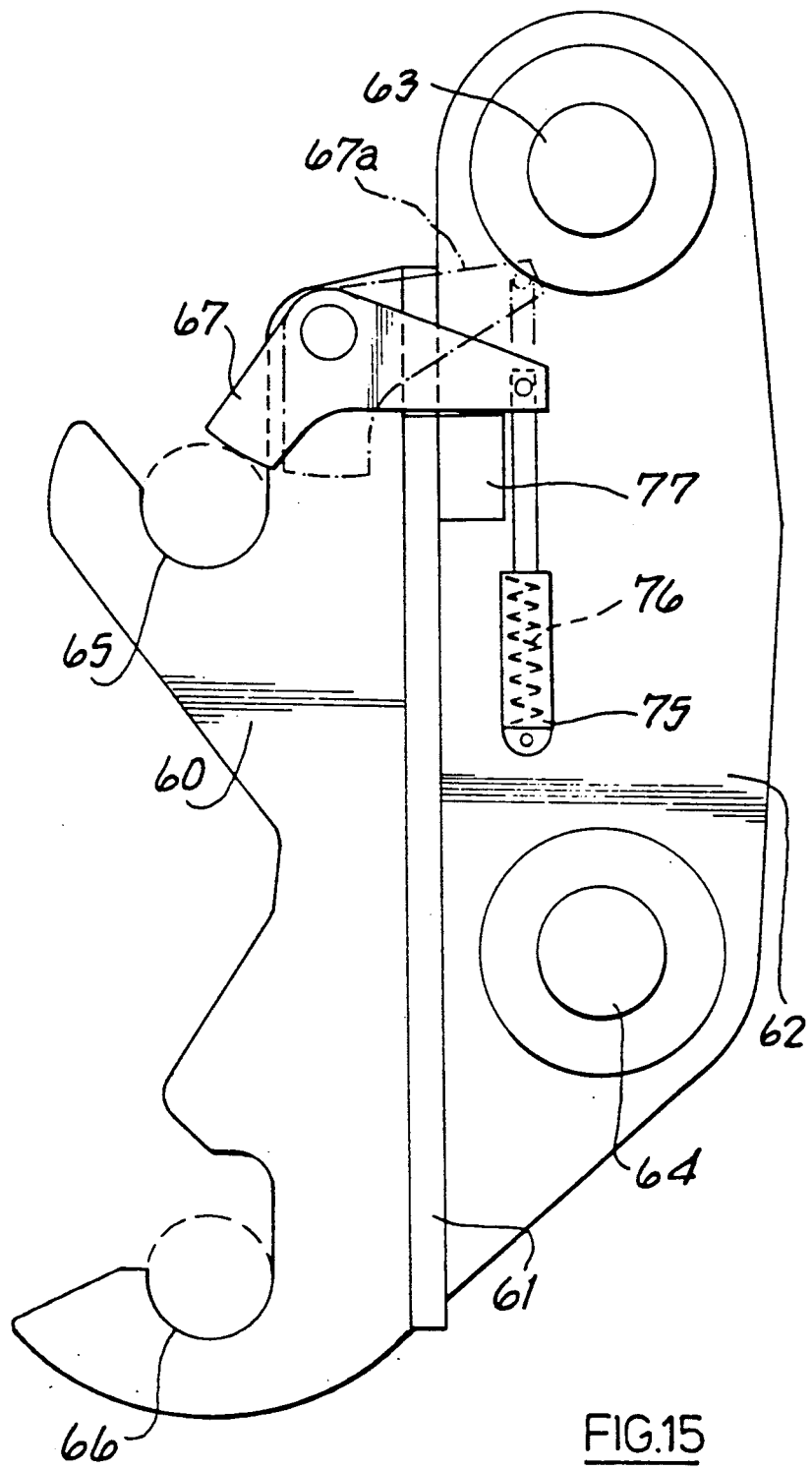
FIG. 15 is an end view of a further form of quick attach coupler for coupling a backhoe bucket to a dipperstick.

FIG. 15 shows a still further form of quick-attach coupler in accordance with the present invention for coupling a backhoe digging bucket to the end of a dipperstick in which components of a similar function to those of the coupler of FIG. 13 have been similarly numbered. In the arrangement shown in FIG. 15 a spring 76 biases the latch to its engaged position (shown in full lines) against a stop 77 and a linear electrical actuator or solenoid 75 is used to move the latch from its engaged position to its dotted releasing position 67a.

The present invention thus provides a quick coupler which is suitable for attaching a wide range of implements in addition to buckets (e.g. fork lift tines, silage grabs, post hole diggers etc) to the support member or members of a wide range of machines such as, for example, twin arm front end loaders, single arm telescopic handlers, fork lifts and rear mounted backhoes.

Also, because of the provision of a threshold in each bottom receiving slot of the coupler, only a relatively low level of force need be applied to the latches 34, 67 in order to ensure that the bucket or other implement remains firmly attached to the coupler.

We claim:

1. A quick-attach coupler for coupling an implement (15) to a machine (11), the coupler including attachment means (25, 29, 63, 64) for attaching the coupler to the machine, a pair of upper slots (20) for receiving an upper coupling means (18) on the implement, said upper slots (20) being upwardly opening and spaced transversely of the coupler, a pair of lower slots (19) for receiving a lower coupling means (17) on the implement, said lower slots (19) being horizontally opening and spaced transversely of the coupler, said lower slots (19) having an opening including a locating formation (19a) which retains the lower coupling means (17) in the lower slots (19), and latch means (34) mounted on the coupler adjacent to the upper slots (20) for extending into the upper slots (20) to retain the upper coupling means (18) within the upper slots (20) and hence preventing the lower coupling means (17) from disengaging the locating formation (19a) of the lower slots (19).

2. A coupler according to claim 1 in which the lower slots (19) are each provided with a tapering lead-in (33) to assist in guiding the lower coupling means (17) on the implement into the lower slots (19).

3. A coupler according claim 1 in which the locating formation of the lower slots (19) comprises a threshold (19a) over which the lower coupling means (17) passes on its way into the slots.

4. A coupler according to claim 1 in which the latch means comprises a pivotally mounted latch (34) which can be held in a first position allowing free access to the upper slots (20) during coupling or de-coupling of an implement and in a second position in which the upper coupling means (18) is held captive in the upper slots (20) to prevent disengagement of the lower coupling means (17) from the locating means (19) of the lower slots.

5. A coupler according to claim 4 in which the latch (34) is held in its two positions by a pin manually inserted through aligned holes (37, 38:39) in the latch and the remainder of the coupler.

6. A coupler according to claim 4 in which the latch (34) is held in its two positions by a spring-loaded detent (50) which acts between the latch and the remainder of the coupler.

7. A coupler according to claim 4 in which the latch (34) is pivotable between its two positions by a fluid pressure operated actuator (69).

8. A coupler according to claim 4 in which the latch (34) is pivotable between its two positions by an electrically operated actuator (75).

9. A twin arm front end loader (10) having a coupler according to claim 1 attached to the loader arms (12) via the attachment means (25, 29).

10. A backhoe digger with dipperstick having a coupler according to claim 1 attached to the dipperstick via the attachment means (63, 64).

11. A quick-attach coupler for coupling an implement (15) to a machine (11), the coupler including attachment means (25, 29) for attaching the coupler to the machine, upper slots (20) for receiving an upper coupling means (18) on the implement, said upper slots being upwardly opening and spaced transversely of the coupler, lower slots (19) for receiving a lower coupling means (17) on the implement, said lower slots (19) being horizontally opening and spaced transversely of the coupler, said lower slots (19) having an opening including a raised threshold (19a) behind which the lower coupling means (17) is retained in the lower slots (19), and latch means (34) mounted on the coupler adjacent to the upper slots (20) for extending into the upper slots (20) to retain the upper coupling means (18) within the upper slots (20) and hence retaining the lower coupling means (17) behind the threshold (19a) of the lower slots (19).

* * * * *